(12) United States Patent
Whitehead

(10) Patent No.: US 7,516,223 B2
(45) Date of Patent: Apr. 7, 2009

(54) METHOD AND SYSTEM FOR COMMUNICATIONS WITH REMOTE EMBEDDED APPLICATIONS

(76) Inventor: Stephen Craig Whitehead, 143 Grove Lane, Hale, Altrincham, Cheshire WA15 8LR (GB)

( * ) Notice: Subject to any disclaimer, the term of this patent is extended or adjusted under 35 U.S.C. 154(b) by 585 days.

(21) Appl. No.: 10/398,704

(22) PCT Filed: Oct. 5, 2001

(86) PCT No.: PCT/GB01/04482

§ 371 (c)(1),
(2), (4) Date: Apr. 7, 2003

(87) PCT Pub. No.: WO02/32078

PCT Pub. Date: Apr. 18, 2002

(65) Prior Publication Data

US 2005/0101270 A1 May 12, 2005

(51) Int. Cl.
*G06F 13/00* (2006.01)
(52) U.S. Cl. .................. 709/227; 709/203; 713/400
(58) Field of Classification Search ......... 709/227–229, 709/217–219, 203; 713/400
See application file for complete search history.

(56) References Cited

U.S. PATENT DOCUMENTS

| | | | | |
|---|---|---|---|---|
| 5,754,830 A | * | 5/1998 | Butts et al. ................... | 719/311 |
| 5,956,487 A | * | 9/1999 | Venkatraman et al. ...... | 709/218 |
| 6,150,955 A | * | 11/2000 | Tracy et al. ............ | 340/870.02 |
| 6,401,239 B1 | * | 6/2002 | Miron ........................ | 707/203 |
| 6,563,800 B1 | * | 5/2003 | Salo et al. ................... | 370/264 |
| 6,609,148 B1 | * | 8/2003 | Salo et al. ................... | 709/217 |
| 6,738,647 B1 | * | 5/2004 | Link, II ...................... | 455/564 |
| 2005/0043011 A1 | * | 2/2005 | Murray et al. .............. | 455/405 |
| 2005/0262247 A1 | * | 11/2005 | Whitehead .................. | 709/227 |

* cited by examiner

*Primary Examiner*—Kenneth R Coulter
(74) *Attorney, Agent, or Firm*—Barnes & Thornburg LLP

(57) ABSTRACT

Data transfer occurs between an ISP database (21) and a vending machine database (11), via respective controllers (22 and 121). TCP ports and sockets (e.g. Telnet) (125, 126) at the module controller (121) and (225, 226) at the database controller (22) are used to establish separate CONTROL and CLEAR channels. The CONTROL channel provides end-to-end control information between the remote module controller (121) and the database controller (22), whilst the CLEAR channel is available to exchange pure end-to-end data.

24 Claims, 4 Drawing Sheets

METHOD AND SYSTEM FOR COMMUNICATIONS WITH REMOTE EMBEDDED APPLICATIONS

This invention relates to communications with remote embedded applications.

In the context of this specification, the term "remote embedded application" means any remote process or device which operates under the control of a local controller (e.g. microprocessor), and has a requirement to exchange data with a central site from time to time.

One example (of many) of a remote embedded application is a vending machine. These days, a vending machine will typically operate under local microprocessor control. However, in order to monitor such data as status, performance and/or stock levels in a vending machine, it is common practice for a communications link to be provided between the remote vending machine and a central site. In this way, the central site can communicate with the vending machine and maintain a check on its status, performance, stock levels, etc.

In a fairly typical arrangement, such a vending machine will have an intelligent communications module (which may be part of the microprocessor of the vending machine). Such a module will be programmed to dial up a specific central site (or connect via a non dial-up link, e.g. Ethernet) in the event of a reportable condition arising at the vending machine, or at predetermined periodic intervals. For this purpose, the communications module has to be programmed with specific data as to how to establish a communications link with the central site, and also how to exchange data with the central site. In short, this requires a certain amount of intelligence in the communications module within the vending machine, together with a certain amount of setting up of the module, which will generally be specific to each machine.

Preferred embodiments of the present invention aim to provide communications modules and communications techniques which may be generally improved in the foregoing respects, affording significantly simpler communications control requirements at the remote embedded application, and providing relatively cheap communication between the remote embedded application and a central site.

According to one aspect of the present invention, there is provided a communications system comprising a computer network server which is arranged to communicate simultaneously with a plurality of remote computers; and a remote embedded application having a controller which is arranged to communicate with said computer network server such that file transfer sessions are carried out between said computer network server and said controller: wherein said server and controller are arranged to establish separate control and data transfer channels via TCP ports and sockets at said server and controller, such that data is transferred between said server and controller over said data transfer channel, and the transfer of such data is controlled by control signals passing between said server and controller over said control channel.

Preferably, said controller communicates with said server via a modem at said remote embedded application.

Preferably, said controller communicates with said server via a global computer network.

Preferably, said global computer network comprises the Internet.

Preferably, each said file transfer session is a File Transfer Protocol (FTP) session.

Preferably, said controller is arranged also to initiate a connection between said controller and said server and, once that connection is made, said controller exchanges data with said remote embedded application under the control of said server.

Preferably, said connection initiated between said module and said server is by way of a simple terminal emulation session.

Preferably, said simple terminal emulation is by way of Telnet protocol.

Preferably, said server is arranged to look up ID data in response to a connection initiated by said controller and use that ID data to establish a file transfer session with said remote embedded application.

Preferably, said server is arranged to transmit to said remote embedded application during each said file transfer session a new public encryption key such that, for each subsequent file transfer session, said server communicates with said controller using the new public encryption key that was transmitted to said remote embedded application during a previous file transfer session.

Preferably, for each said subsequent file transfer session, said server logs on to said controller using the new public encryption key that was transmitted to said remote embedded application during the immediately previous file transfer session.

Preferably, said server is arranged to transmit to said remote embedded application, prior to at least an initial file transfer session, real time clock data in order to synchronise a clock local to said controller with a clock local to said server or another reference clock which is used by said server, thereby to synchronise date and time data as between said server and said remote embedded application.

Said controller may be arranged to transmit said real time clock data to said remote embedded application during only an initial set up procedure of said controller.

Said server may be arranged to transmit said real time clock data to said controller prior to each said file transfer session after x prior file transfer sessions, where x is 1 or greater than 1.

Said server may be arranged to compare the local time at said controller with the local time at said server and to make a decision, based on the result of that comparison, whether to transmit real time clock data to said remote embedded application, thereby to synchronise date and time data as between said server and said remote embedded application.

Preferably, said controller is programmed, upon installation of the controller, to establish communication with and register with a central registration database, in order to transfer data files from said database to said remote embedded application in order to set up and configure said controller for subsequent file transfer sessions with said computer network server.

Preferably, said database is provided by said computer network server.

Preferably, said server is arranged to call said controller using Calling Line Identification (CLI); and wherein said controller is arranged:
  to detect said call and said CLI from said server;
  to not answer said call from said server; and
  to initiate a call to said server a predetermined time after said call and said CLI have been received from said server.

Preferably, said server is arranged to call said controller under control of one of said remote computers.

Preferably, said server is arranged to connect said controller with one of said remote computers.

According to another aspect of the present invention, there is provided a method of communication between a computer network server, which is arranged to communicate simultaneously with a plurality of remote computers, and a remote embedded application, having a controller which is arranged to communicate with said computer network server such that file transfer sessions are carried out between said computer network server and said remote embedded application, wherein said server and controller establish separate control and data transfer channels via TCP ports and sockets at said server and controller, such that data is transferred between said server and controller over said data transfer channel, and the transfer of such data is controlled by control signals passing between said server and controller over said control channel.

Preferably, said computer network server and said remote embedded application are comprised in a system in accordance with any of the preceding aspects of the invention.

For a better understanding of the invention, and to show how embodiments of the same may be carried into effect, reference will now be made, by way of example, to the accompanying diagrammatic drawings, in which:

FIG. 1 illustrates a remote embedded application, in the form of a vending machine 1, which is arranged to communicate with a central site, in the form of an Internet Service Provider (ISP) Server 2, over the Internet.

Figure 1:
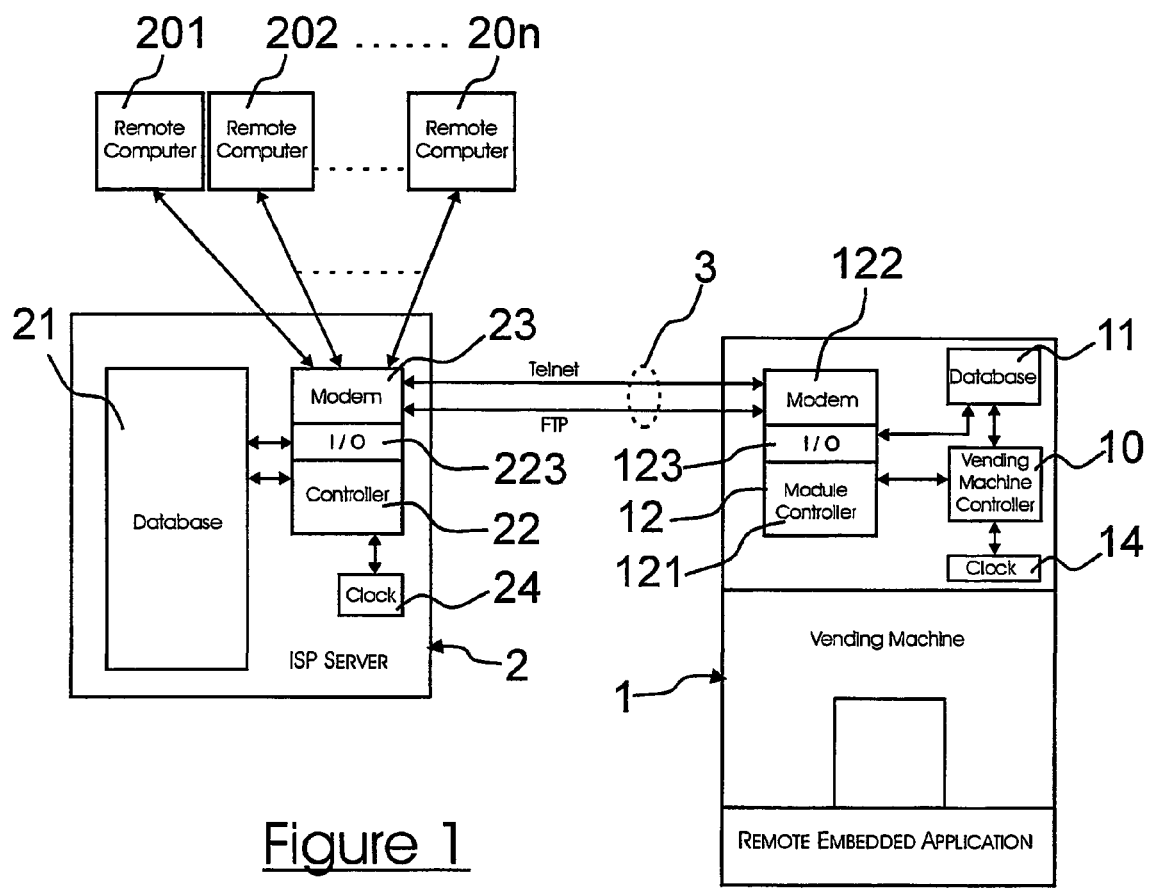
FIG. 1 is an illustration of one example of a communications module in a remote embedded application.

The vending machine 1 incorporates an intelligent controller 10 which controls the normal functions of the vending machine 1 and also maintains a local database 11 which maintains a record of various parameters at the vending machine 1—e.g. current operating status, performance, stock levels, currency levels, etc. (Some applications may have more than one controller such as 10 to perform and/or control different functions but, for simplicity, reference is made here just to one controller 10, it being well understood by those skilled in the art that this may represent a plurality of controllers.)

The vending machine 1 also incorporates a communications module 12 which includes a module controller 121, a modem 122 and i/o ports 123. Although in FIG. 1 the module controller 121, modem 122 and i/o ports 123 are shown separately from the vending machine controller 10, any or all could alternatively be integrated with it.

Figure 2:
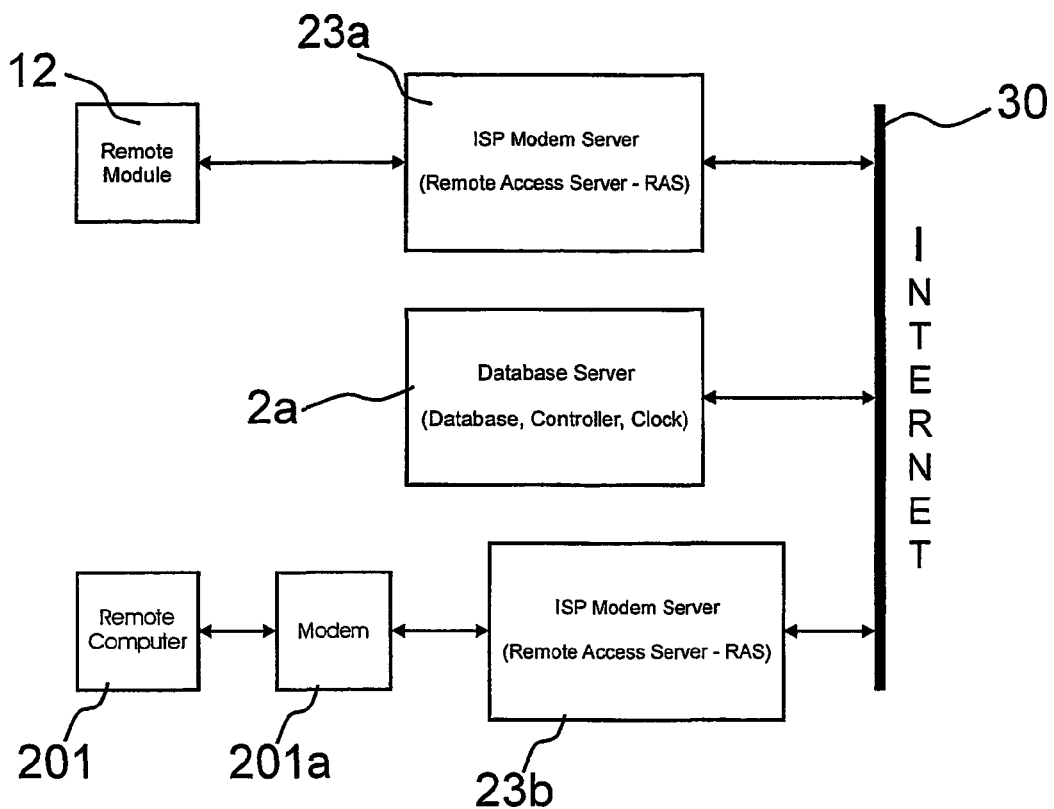
FIG. 2 is a more detailed illustration of a communications link distributed over the Internet.

The ISP server 2 is in effect a computer network server which is arranged to communicate simultaneously with a plurality of remote computers 201, 202 . . . 20n. The ISP server 2 further comprises a database 21, a controller 22, i/o ports 223, a modem 23 and a clock 24. For simplicity, the modem 23 is shown as within the ISP Server 2 although, in an Internet configuration, the modem 23 may typically be located at a different site than the database 21, as illustrated in FIG. 2, which is described in more detail below.

A communications link 3 is provided between the vending machine 1 and the ISP server 2. The communications link 3 may take any suitable form but, in this example, utilises the Internet, which is accessed by both the vending machine 1 and the ISP server 2 via their respective modems 122 and 23. However, it is to be understood that the communications link 3 could take any convenient form, which does not necessarily require the use of a modem such as 122 or 23 at either end of the link Both hard wired and wireless links maybe employed, as may both dial-up and permanent connections (e.g. Ethernet, ADSL, Intranet, WAN, etc.).

The vending machine 1, together with the ISP server 2 and the communications link 3, make up a communications system which operates as follows.

When it is desired for the vending machine 1 to communicate with the central database 21, either upon a reportable condition arising at the vending machine 1 or at predetermined periodic intervals, the module controller 121 initiates an Internet dial-up session via the modem 122, and establishes a link with the ISP server 2 (of known IP address). This may be, for example, by way of a Telnet session, with the module controller 121 providing an ID (username/password) to log onto the database 21.

Once the Telnet session has been established, the ISP server 2 synchronises a local clock 14 of the vending machine 1 with the dock 24 of the ISP server 2. Updating the local vending machine dock 14 in this way enables any necessary time adjustment at the vending machine 1, to provide more accurate synchronisation as to time and date, as between the vending machine 1 and the ISP server database 21. Alternatively, the clock 14 of the vending machine 1 may need to be synchronised with the clock 24 of the ISP server 2, only when the module 12 is first installed and powered up (see below).

The communications link 3 having thus been set up, the ISP server 2 establishes an (File Transfer Protocol) session back to the vending machine module 12, which is set up to operate as an FTP Server. To this end, the ISP server 2 looks up from the database 21 an appropriate ID (username/password) for the particular vending machine module 12, to establish the FTP session.

At that point, the ISP server 2 takes control of any necessary exchange of files with the vending machine module 12. It is important to appreciate that, in order to establish such an FTP session, it has not been necessary for the ISP server 2 to initiate a call to the remote embedded application of the vending machine 1. On the contrary, it is the vending machine 1 that has initiated the call. But once the initial (e.g.) Telnet session has been set up, the ISP server 2 then takes over and sets up the FTP session.

Also, since control of the exchange of files in the FTP session between the database 21 and the vending machine module 12 rests entirely with the ISP server 2, substantially all intelligence and control may remain at the ISP server 2, with the vending machine module 12 having only minimal requirements. This arrangement provides substantial flexibility, since "decision making" software need not be embedded in the remote module 12. This allows for much simpler software upgrades to the system. In most case, software upgrades can be accomplished entirely by a single operation at the ISP server 2, rather than at many remote modules such as 12. The absence or minimisation of decision-making software at the remote unit 12 minimises code downloads when new decisions need to be made. The remote unit 12 can request the database server 2 for certain actions—for example, download a specific file. However, the database server 2 can override any requests due to other events—for example, if a PC user (see below) has requested a specific function which takes priority.

With the FTP session established and any necessary time adjustment made as between the ISP server clock 24 and the vending machine dock 14, files can be exchanged between the ISP server database 21 and the vending machine database 11 as necessary. For example, latest vending machine prices may be downloaded from the ISP server database 21 to the vending machine database 11, when the time and date stamping of files indicates that the files at the vending machine 1 require updating. The ISP server database 21, under the control of controller 22, will automatically upload the latest collected data files from the vending machine 1 for example, vending machine stock levels, currency levels, etc. File transfers may take place in response to requests from the module 12 (or a remote computer 201, 202 . . . 20*n*)—for example, in response to a flag set at the module 12 (or remote computer) to indicate a file transfer request.

Once the files between ISP server database 21 and vending machine database 11 have been synchronised, the ISP server 2 can then teardown the FTP session.

Thus, in this way, significant advantages of ease and cost of communication can be obtained, firstly by making use of the Internet (where local call charges usually apply) to provide communication between the remote embedded application and the ISP server 2, and secondly by employing a relatively simple communications controller 12 in the remote embedded application, to leave intelligence and control of file transfer sessions principally with the ISP server 2. As noted above, there is no requirement for the ISP server 2 to initiate a call to the remote embedded application. The remote embedded application initiates the call, but the file transfer is then set up by the ISP server 2. The transmission of real-time information from the ISP server 2 to the remote embedded application over the initial Telnet session can be particularly advantageous to ensure correct time sequencing of the files at the respective ends of the communications link.

As mentioned above, in an Internet implementation, the modem access may typically be more distributed than shown in FIG. 1. This is shown in more detail in FIG. 2. Here, the remote module 12 connects with an ISP modem server 23*a*, which provides a local point of presence, and communicates over the Internet 30 with database server 2*a*, which contains database 21, controller 22 and clock 24. (The clock could be local to the database 21 as shown or derived from another clock source on the Internet network—e.g. an atomic clock source.) Likewise, remote computer 201 (202 . . . 20*n*) connects with another ISP modem server 23*b*, which provides another local point of presence, and communicates over the Internet 30 with database server 2*a*.

In one example of an alternative configuration, the modems and Remote Access Servers of FIG. 2 can be dispensed with and the various components permanently connected, e.g. by way of an Ethernet or Intranet configuration. Either or both of the remote module 12 and remote computer could have respective databases which are either local or remotely connected over the network.

The structure of the ISP server 2 is such as to facilitate the lookup of Public Encryption Keys, which will be different for the Telnet and FTP sessions. The Telnet Public Key will be a key which is common to the ISP server 2, which typically will service a large number of embedded applications, such as the vending machine 1. However, the FTP Public Key can be unique to the vending machine module 12. The latter feature enables a particularly advantageous encryption method, which combines simplicity with high security. This operates as follows.

Once files between the ISP server database 21 and the vending machine database 11 have been synchronised, and before the current FTP session ends, the ISP server 2 can send to the vending machine module 12 a new Public Encryption Key for the next FTP session on the next call from the vending machine module 12. In other words, each time a new FTP session is initiated by the ISP server 2, it uses a Public Encryption Key for the vending machine module 12 (operating then as an FTP Server) which has been transferred as a file to the vending machine module 12 during the previous FTP session. It will be appreciated that this affords a high degree of security. By the same token, it also allows a more simple encryption algorithm to be used for a given degree of security, since data synchronisation FTP sessions between the ISP server 2 and the vending machine module 12 will typically be small and therefore more difficult to crack, when the FTP Public Key is changed dynamically from one session to the next.

Figure 4:
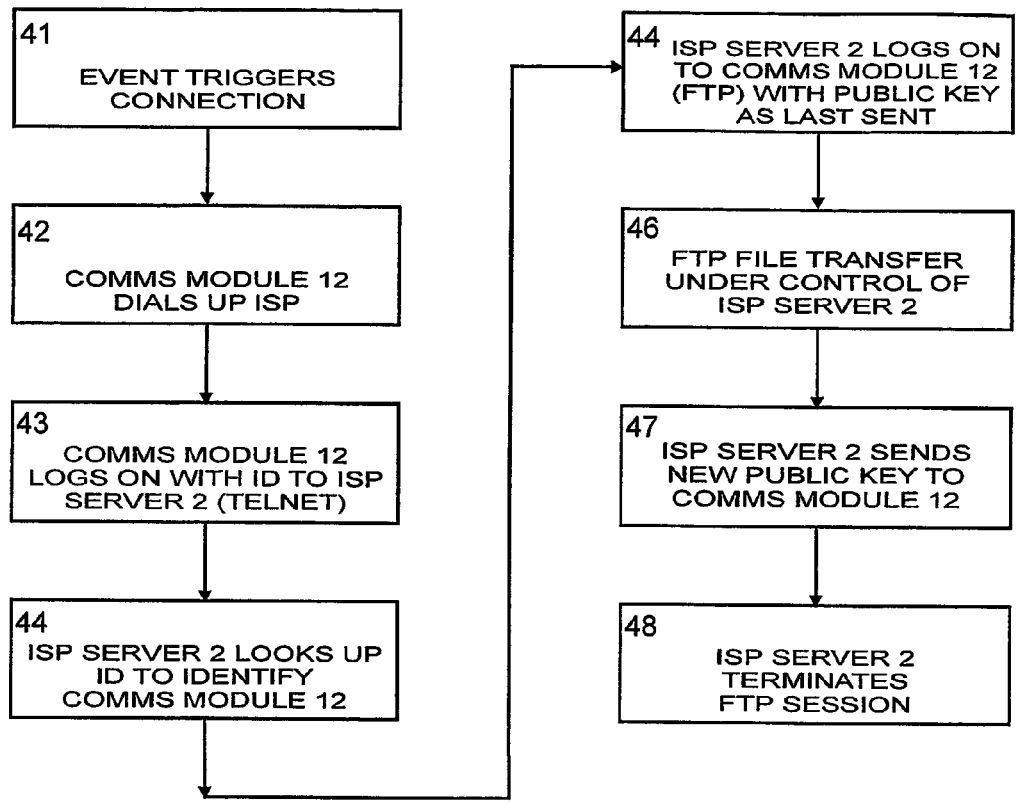
FIG. 4 is a simple flow chart to illustrate a method of establishing a file transfer session between a remote embedded application and an ISP Server, with dynamic Public Key assignment.

FIG. 4 is a simple flow chart to illustrate the above-described method of establishing a file transfer session between remote embedded application 1 and ISP Server 2, with dynamic Public Key assignment.

In step 41, an event occurs to trigger a connection request between vending machine 1 and ISP Server 2. For example, this may be due to a particular event arising at the vending machine 1, or to a particular time event arising, which requires a routine connection to the ISP Server 2.

In step 42, the communications module 12 dials up the respective Internet Service Provider and, in step 43, logs on to the ISP Server 2 with appropriate ID, by way of a Telnet session.

In step 44, the ISP Server 2 looks up the ID received in the initial Telnet session, in order to identify the particular communications module 12. In step 44, the ISP Server 2 logs on to the communications module 12 to establish an FTP session, using the FTP Public Key as sent to the module 12 during the last file transfer session.

In step 46, file transfer proceeds between the ISP database 21 and the remote application database 11, under control of the ISP Server 2 and, during that file transfer process or at the end of it, the ISP Server 2 sends, in step 47, a new Public Encryption Key to the module 12 for the next FTP session.

With all of the file transfers completed, the ISP Server 2 terminates the FTP session in step 48.

Another preferred and advantageous feature of the illustrated communications system concerns the procedure for first installing the vending machine module 12.

When installed, the vending machine module 12 is programmed with a unique serial number. It is also programmed to dial up and connect to a specific registration database when first installed and powered up in the vending machine 1. In other words, as a new item of equipment, the vending machine module 12 requires only minimal programming. Many similar modules 12 can be programmed in almost exactly the same way with almost exactly the same information, each differing only in its own unique serial number.

When the vending machine module 12 dials up the registration database for the fist time, the registration database identifies the specific module 12 by means of its unique serial number, and then programs the module 12 with all of its relevant customised configuration—such as, for example, Telnet and FTP passwords, FTP Public Encryption Keys, telephone numbers for local ISP access local telephone rates), customer name, customised web pages, new user configuration, subsequent database IP addresses, etc. Having been programmed with all of this data, the vending machine 12 is then ready to dial up the ISP server 2 over the communications link 3, as described above, for regular Telnet/FTP sessions. Thus, the installation process for the vending machine module 12 is substantially automated. As indicated above, the initial registration procedure can include an initial dock synchronisation step between a central clock such as 24 and the clock 14 of the module 12.

The registration procedure for the remote module 12 is carried out in just the same way as the above-described ISP server access—that is an initial Telnet session followed by an FTP session. This is a real benefit of centrlised decision-making as described above. The remote module 12 purely has files transferred through it. It does not need to know whether these are configuration files, as in the case of initial registration, or whether they are data files for normal operation. The registration database could be totally separate from the usual "application" database 21, or it could actually be the same database.

Figure 5:
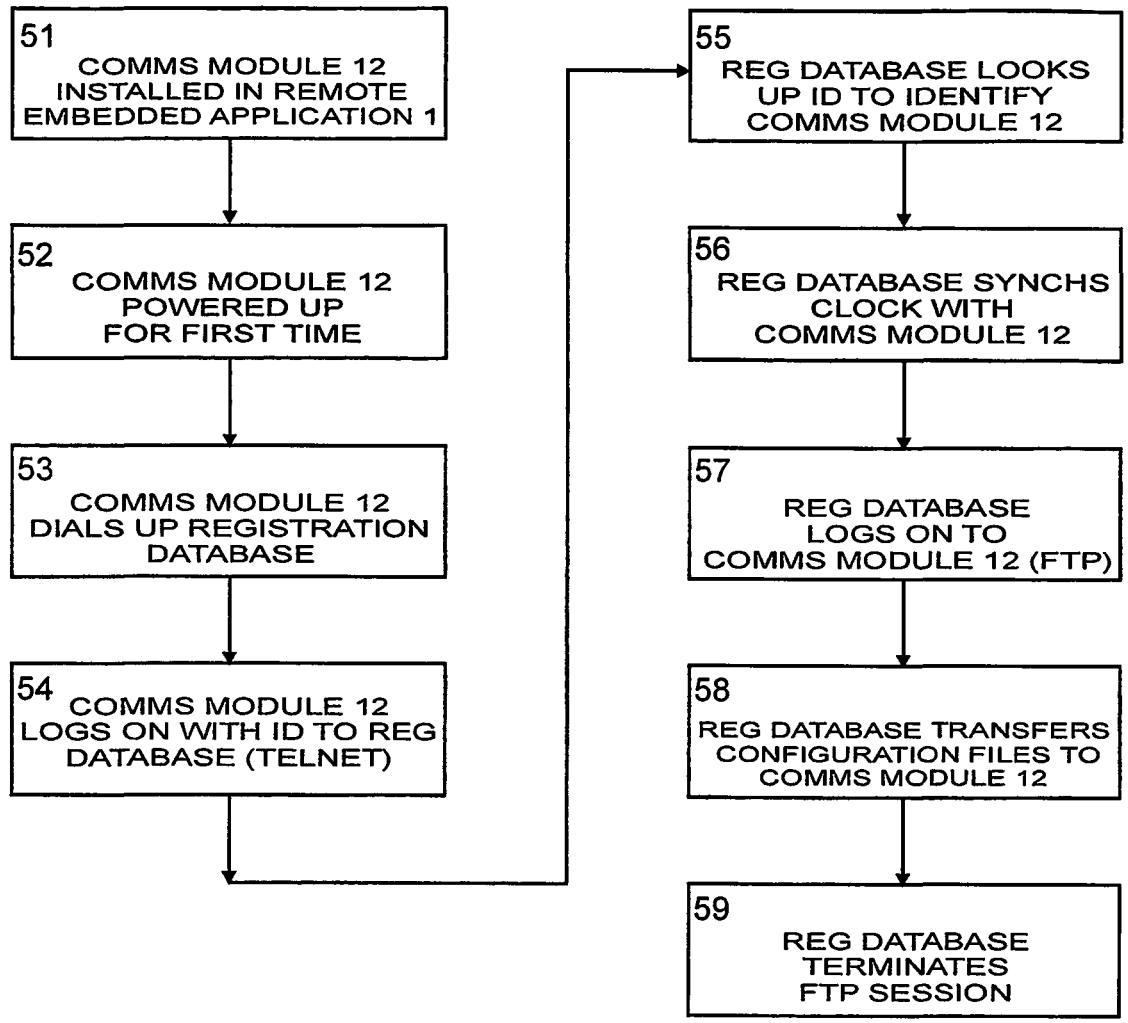
FIG. 5 is a simple flow diagram to illustrate the steps in an initial registration procedure.

FIG. 5 is a simple flow diagram to illustrate the steps in the above-described registration procedure.

In step 51, the communications module 12 is installed in the remote embedded application 1 and, in step 52, it is powered up for the first time. In step 53, the communications module 12 dials up the registration database and in step 54 logs on to it with its predetermined ID which, as described above, may be its unique serial number, in order to establish a Telnet session.

In step 55, the registration database looks up the ID supplied from the module 12 in order to identify the particular module and then, in step 56, it synchronises its own local clock (or the clock that it uses) with that of the module 12.

In step 57, the registration database logs on to the communications module 12 to establish an FTP session and, in step 58, it transfers the necessary set up and configuration files to the module 12. When all of this is completed, the registration database terminates the FTP session in step 59.

As noted above, in addition to providing Internet service to a plurality of communication modules such as 12 for various remote embedded applications, the ISP server 2 also provides Internet service for a large number of remote computers 201, 202 ... 20n which, so far as the ISP server 2 is concerned, will typically be connected as PC Browsers. Thus, a user on remote computer 201, subject to submission of appropriate ID (username/password), can gain access to the database 21 and therefore obtain information as to the current state of the vending machine 1 at the last time a dial up session was established between the vending machine 1 and the ISP server 2. This might be regarded as a "snapshot" in time of the status of the vending machine 1. In this way, subject to suitable security restrictions, an owner of a number of vending machines (or other embedded applications) can view their status conveniently via the database 21, over a relatively cheap and simple Internet connection via the ISP server 2.

In an optional variant, the user of remote computer 201 can look directly at the vending machine 1. This operates as follows.

Once connected to the ISP server 2, the user of computer 201 can cause the ISP server to dial up the vending machine module 12, which is provided with Calling Line Identification (CLI) Service, to indicate to the called module 12 the identity of the calling party. The ISP server 2 will cause the vending machine modem 122 to be called for one or more ring periods (or for a predetermined time, particularly if the CLI comes before the first ring, such that no-ring calls can be supported). The communications module 12 detects from the CLI that the ISP server 2 has called, and is programmed not to answer the call. However, the communications module 12 is programmed to dial back after a short duration to establish a Telnet session (generally as described above) with the ISP server 2, which then in turn establishes an FTP session with the communications module 12, also generally as described above.

Then, furnished with the appropriate IP addresses, the ISP server 2 connects the remote computer 201 directly with the vending machine 1, via the communications module 12. This enables the user of remote computer 201 to view the data in the remote embedded application in real-time, and optionally, exchange data files with it and/or the ISP server 2.

In this way, the user of remote computer 201 (202 ... 20n) can dial up and view any desired remote embedded application at will, using a communications link established over the Internet. Again, by use of the CLI, one is able to overcome the presently accepted restriction that ISP's will not initiate a call, and thereby ensure that any call charges remain with the owner of the vending machine module 12, rather than being attributed to the ISP server 2.

In the above procedure, the dynamically assigned IP address of the remote module 12 is captured at the database 21 and forwarded to the remote computer 201. This allows the remote computer 201 to browse the module 12 directly, since the module has its own embedded web server. Therefore, this provides a mechanism for the remote computer 201 to interrogate the remote module 12 in real time. So far as the remote module 12 is concerned, it has had a request to synchronise with the database 21, using Telnet/FTP sessions. The database controller 22 can make the appropriate decisions as to whether to transfer files and/or "connect" the remote computer 201 to the remote module 12. For example, the remote computer 201 may update some configuration at the database 21, request that this be transferred immediately to the remote module 12, and request that it view the module 12 in real time to see the effect of the configuration changes. This is another significant benefit of centralised decision-making as described above.

The use of CLI can be extended such that the ISP server 2 may dial any desired remote embedded application at any desired time, in order to initiate a return call from the communications module 12, to establish a Telnet session followed by a FTP session, generally as described above. Thus, the use of CLI is not just reserved for connecting remote computers 201, etc to remote module 12. The remote computer 201 can make changes at the database 21, for one or more remote modules 12. The ISP server 2 could then subsequently use CLI to request that the remote modules 12 synchronise immediately, rather than waiting for predetermined dial up times.

Figure 6:
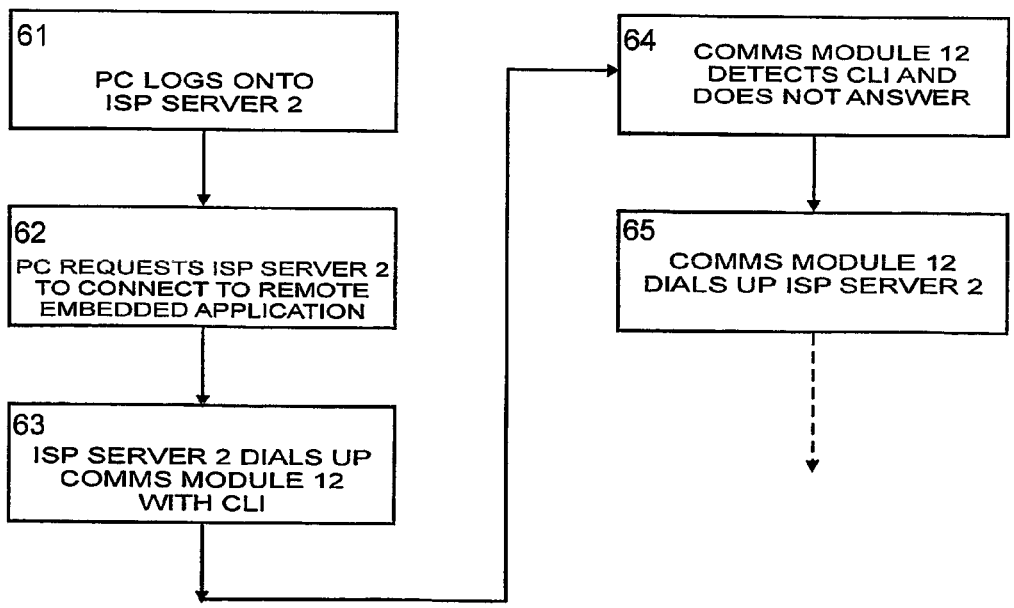
FIG. 6 is a simple flow diagram to illustrate the initial steps in establishing a connection between an ISP Server and a remote application by use of Calling Line Identification (CLI).

FIG. 6 is a simple flow diagram to illustrate the initial steps in establishing a connection between ISP Server 2 and remote application 1 by use of CLI, as described above.

In step 61, a PC (e.g. remote computer 201) logs on to the ISP Server 2, to establish a typical web browsing session. In step 62, the PC requests the ISP Server 2 to connect to the remote embedded application 1 and, in step 63, the ISP Server 2 dials up the module 12 using CLI. In step 64, the module 12 detects the CLI but does not answer the incoming call. After a predetermined time, the module dials back to the ISP Server 2 in step 65. Thereafter, a file transfer session may be implemented, using techniques as described above, and involving the remote application 1, ISP Server 2 and, optionally, remote computer such as 201. Alternatively or additionally, the remote computer such as 201 may be connected directly to the remote embedded application 1.

During a synchronisation process, a direct communication channel could be opened with the remote embedded application 1, thereby allowing real time data to be captured from equipment of the remote embedded application 1, rather than the data as last stored in the local database 11. One way of providing such a channel is described below.

Figure 3:
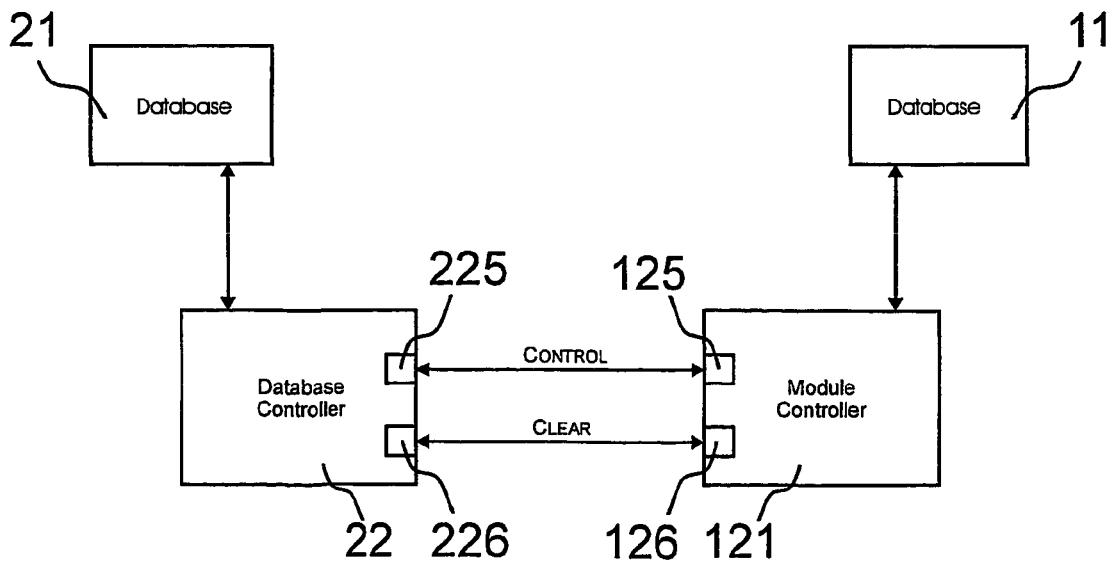
FIG. 3 illustrates schematically the use of (TCP Transmission Control Protocol) ports and sockets for the controlled transmission of data.

FIG. 3 illustrates an advantageous option for providing data transfer between the ISP database 21 and the vending machine database 11, via their respective controllers 22 and 121. For simplicity, the modems 23 and 122 are not shown in FIG. 3 and, as is evident from the above description, modems are not invariably required anyway, depending upon the kind of network employed.

FIG. 3 illustrates schematically the use of TCP ports and sockets (e.g. Telnet) 125, 126 at the module controller 121 and 225, 226 at the database controller 22, to establish separate CONTROL and CLEAR channels. These are similar to the D-channel and B-channel in an ISDN environment. The CONTROL channel provides end-to-end control information between the remote module controller 121 and the database controller 22, whilst the CLEAR channel is available to exchange pure end-to-end data.

For example, the remote module controller 121 may connect to the database controller 22, using the CONTROL channel established between TCP ports and sockets 125 and 225. A data transfer command or request is transmitted between the database controller 22 and the remote module controller 121 (in either direction) to indicate that it is wished to transfer data from the remote database 11 into a file on the ISP database 21. If it is not already established, the CLEAR channel is set up between TCP ports and sockets 126 and 226, and data is them streamed over the CLEAR channel to the database controller 22, which captures the data in a file in the database 21. During the data transfer process, the CONTROL channel between TCP ports and sockets 125 and 225 provides end-to-end control—for example, STOP, START, PAUSE, etc; or can provide remote control commands to attached equipment—e.g. PAN/TILT commands whist capturing real compressed video images.

The above basic mechanism allows the ISP server 2 to act as a kind of "telephone exchange" between remote computers 201, 202, etc and remote embedded applications such as 1 which have no direct human control. It may be particularly advantageous when used in conjunction with the CLI ring back procedure that is described above. It may enable higher levels of service to be provided, which may be similar to telephony environments—for example, automatic divert of a TCP/IP session from the database 21 to remote computer 201, 202, etc—under the control of decision making at the database server 2.

Although a vending machine has been conveniently described above as an example of a remote embedded application, it will appreciated that such applications may take very many different forms. As just a few further examples of many, one may also consider fuel level monitoring, utility automatic metering reading, security systems, data logging, electronic point of sale terminals, industrial control, logistic management, domestic appliances, digital tv/set-top boxes and remote telemetry systems.

Also, although the Internet has been given as one very convenient example, it is to be understood that the ISP server 2 may be replaced by any computer network server which effectively is arranged to communicate simultaneously with a plurality of remote computers, whether on a local, large area, national, international, or global network Embodiments of the invention may be used with advantage in environments which include Internet, Extanet, Intranet, and private or public packet switched or circuit switched networks.

It is to be further appreciated that, in the above described examples, the protocols of Telnet and FTP are just examples or many different kinds of protocols that may be utlised. For example, UDP (User Datagram Protocol) may be utilised as a protocol that is part of the TCP/IP suite of protocols. Instead of Telnet, any file transfer protocol, mechanism or procedure may be used. Instead of FP, one may use any standard or proprietary protocol transferred over a TCP or UDP port or socket.

In this specification, the verb "comprise" has its normal dictionary meaning, to denote non-exclusive inclusion. That is, use of the word "comprise" (or any of its derivatives) to include one feature or more, does not exclude the possibility of also including further features.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A communications system comprising a computer network server which is arranged to communicate simultaneously with a plurality of remote computers; and a remote embedded application that is adapted to operate without direct human control, the remote embedded application having a controller which is arranged to communicate with said computer network server such that tile transfer sessions are carried out between said computer network server and said controller: wherein said server and controller are arranged to establish separate control and data transfer channels via TCP ports and sockets at said server and controller, such that data is transferred between said server and controller over said data transfer channel, and the transfer of such data is controlled by control signals passing between said server and controller over said control channel; and said server is arranged to divert a file transfer session with said controller, from said server to another remote device, while retaining control of the session.

2. A communications system according to claim 1, wherein said controller communicates with said server via a modem at said remote embedded application.

3. A communications system according to claim 1, wherein said controller communicates with said server via a global computer network.

4. A communications system according to claim 3, wherein said global computer network comprises the Internet.

5. A communications system according to claim 1, wherein each said file transfer session is a File Transfer Protocol (FTP) session.

6. A communications system according to claim 1, wherein said controller is arranged also to initiate a connection between said controller and said server and, once that connection is made, said controller exchanges data with said remote embedded application under the control of said server.

7. A communications system according to claim 6, wherein said connection initiated between said module and said server is by way of a simple terminal emulation session.

8. A communications system according to claim 6, wherein said connection initiated between said module and said server is by way of Telnet protocol.

9. A communications system according to claim 6, wherein said server is arranged to look up ID data in response to a connection initiated by said controller and use that ID data to establish a file transfer session with said remote embedded application.

10. A communications system according to claim 1, wherein said server is arranged to transmit to said remote embedded application during each said file transfer session a new public encryption key such that, for each subsequent file transfer session, said server communicates with said controller using the new public encryption key that was transmitted to said remote embedded application during a previous file transfer session.

11. A communications system according to claim 10, wherein for each said subsequent file transfer session, said server logs on to said controller using the new public encryption key that was transmitted to said remote embedded application during the immediately previous file transfer session.

12. A communications system according to claim 1, wherein said server is arranged to transmit to said remote embedded application, prior to at least an initial file transfer session, real time clock data in order to synchronise a clock local to said controller with a clock local to said server or another reference clock which is used by said server, thereby to synchronise date and time data as between said server and said remote embedded application.

13. A communications system according to claim 12, wherein said controller is arranged to transmit said real time clock data to said remote embedded application during only an initial set up procedure of said controller.

14. A communications system according to claim 12, wherein said server is arranged to transmit said real time clock data to said controller prior to each said file transfer session after x prior file transfer sessions, where x is 1 or greater than 1.

15. A communications system according to claim 12, wherein said server is arranged to compare the local time at said controller with the local time at said server and to make a decision, based on the result of that comparison, whether to transmit real time clock data to said remote embedded application, thereby to synchronise date and time data as between said server and said remote embedded application.

16. A communications system according to claim 1, wherein said controller is programmed, upon installation of the controller, to establish communication with and register with a central registration database, in order to transfer data files from said database to said remote embedded application in order to set up and configure said controller for subsequent file transfer sessions with said computer network server.

17. A communications system according to claim 16, wherein said database is provided by said computer network server.

18. A communications system according to claim 1, wherein said server is arranged to call said controller using Calling Line Identification (CLI); and wherein said controller is arranged:
   to detect said call and said CLI from said server;
   to not answer said call from said server; and
   to initiate a call to said server a predetermined time after said call and said CLI have been received from said server.

19. A communications system according to claim 18, wherein said server is arranged to call said controller under control of one of said remote computers.

20. A communications system according to claim 18, wherein said server is arranged to connect said controller with one of said remote computers.

21. A communications system according to claim 1, wherein communication between said computer network server, said plurality of remote computers and said remote embedded application is carried out in an environment selected from the group comprising hard wired connections, wireless connections, Ethernet, Extranet, Intranet, WAN, private networks, public networks, packet switched networks and circuit switched networks.

22. A communications system according to claim 1, wherein said other remote device is one of said remote computers.

23. A method of communication between a computer network server, which is arranged to communicate simultaneously with a plurality of remote computers, and a remote embedded application that is adapted to operate without direct human control, the remote embedded application having a controller which is arranged to communicate with said computer network server such that file transfer sessions are carried out between said computer network server and said remote embedded application, wherein said server and controller establish separate control and data transfer channels via TCP pods and sockets at said server and controller, such that data is transferred between said server and controller over said data transfer channel, and the transfer of such data is controlled by control signals passing between said server and controller over said control channel; and said server is arranged to divert a file transfer session with said controller, from said server to another remote device, while retain in control of the session.

24. A method according to claim 23, wherein said computer network server and said remote embedded application are comprised in a system comprising a computer network server which is arranged to communicate simultaneously with a plurality of remote computers; and a remote embedded application having a controller which is arranged to communicate with said computer network server such that file transfer sessions are carried out between said computer network server and said controller: wherein said server and controller are arranged to establish separate control and data transfer channels via TCP ports and sockets at said server and controller, such that data is transferred between said server and controller over said data transfer channel, and the transfer of such data is controlled by control signals passing between said server and controller over said control channel.

* * * * *